United States Patent [19]
Kirschner

[11] Patent Number: 6,024,119
[45] Date of Patent: Feb. 15, 2000

[54] FLOW CONTROL SYSTEM HAVING ACTUATED ELASTOMERIC MEMBRANE

[75] Inventor: Ivan N. Kirschner, Portsmouth, R.I.

[73] Assignee: The United States of America as represented by the Secretary of the Navy, Washington, D.C.

[21] Appl. No.: 09/062,567

[22] Filed: Apr. 20, 1998

[51] Int. Cl.[7] .............................. F16K 31/12; B64C 1/38; B63B 1/34
[52] U.S. Cl. ...................... 137/487.5; 114/67 R; 244/130
[58] Field of Search .................... 114/67 R; 244/130, 244/204, 203; 137/487.5

[56] References Cited

U.S. PATENT DOCUMENTS

| | | | |
|---|---|---|---|
| 2,366,162 | 1/1945 | Vang | 114/67 |
| 3,161,385 | 12/1964 | Kramer | 141/67 R |
| 3,362,663 | 1/1968 | Wehrmann | 244/130 |
| 3,621,803 | 11/1971 | Foster | 141/67 R |
| 4,516,747 | 5/1985 | Lurz | 244/204 |
| 5,769,389 | 6/1998 | Jacobsen et al. | 251/129.06 |
| 5,791,275 | 8/1998 | Bandyopadhyay | 114/67 R |
| 5,803,409 | 9/1998 | Keefe | 244/130 X |

Primary Examiner—Denise L. Ferensic
Assistant Examiner—Joanne Y. Kim
Attorney, Agent, or Firm—Michael J. McGowan; James M. Kasischke; Prithvi C. Lall

[57] ABSTRACT

A flow control system is used to control fluid flow at the boundary layer of an object or body about or within which the fluid flows relative to the body. The flow control system includes an actuated membrane that is displaced in a direction substantially tangential to the actuated membrane, thereby causing a disturbance or modified shear stress distribution in the boundary layer fluid flow. One or more sensor elements are disposed proximate a top region of the actuated membrane for sensing fluid conditions at the boundary layer flow. A membrane actuator provides the displacement, for example, by extending or contracting the actuated membrane in a direction substantially tangential to the actuated membrane. A feedback device is responsive to a system of sensor elements and is coupled to a system of membrane actuators to cause the displacement in one or more regions of the actuated membrane in response to the sensed fluid conditions. The flow control system controls the fluid flow by providing turbulence modification and reducing drag, radiated noise, and other undesirable effects caused by fluid flow relative to an object.

20 Claims, 3 Drawing Sheets

FLOW CONTROL SYSTEM HAVING ACTUATED ELASTOMERIC MEMBRANE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to flow control systems and in particular, to a flow control system having an actuated elastomeric membrane that is deformed or displaced in order to control the flow of a fluid against the elastomeric membrane.

(2) Description of the Prior Art

Turbulent fluid flow against a surface often causes drag or radiated noise due to forces from the boundary layer of the flowing fluid acting on the proximate surface. One area in which turbulent fluid flow is of particular concern is at the surface of an underwater vehicle or vessel where hydrodynamic drag and hydroacoustic radiated noise is undesirable. In the typical boundary layer fluid flow, the fluid velocity at the surface relative to the object or body approaches zero. Moving outwardly from the surface of the object or body, the time-averaged fluid velocity gradually approaches that of the ambient fluid. The instantaneous turbulent velocity profile, however, can be very complicated.

Some attempts have been made at controlling this boundary layer fluid flow, for example, using passive and active compliant coatings, magnetohydrodynamic devices, introduction of polymers, introducing fluid, applying suction, and heating. Such techniques have had limited effectiveness at reducing drag and radiated noise at the surface. The effect of active compliant coatings acting through motion which is primarily normal to the surface of the coating has also been limited. Providing motion normal to the surface with an active compliant coating often causes undesirable effects associated with disturbances to the local pressure field, for example, local adverse pressure gradients. Passive compliant coatings and other passive techniques for controlling flow are even less effective in controlling or altering the boundary layer flow.

SUMMARY OF THE INVENTION

One object of the present invention is to provide a flow control system that controls boundary layer flow in a fluid to reduce drag and eliminate noise.

Another object of the present invention is to provide an actuated elastomeric membrane that is displaced or deformed in a direction substantially tangential to the surface of the elastomeric membrane for imposing a sheer stress distribution in the fluid particles along the surface of the elastomeric membrane.

A further object of the present invention is to provide a flow control system that actuates the elastomeric membrane in response to a sensed flow condition at the surface providing favorable disturbances to the flow, delaying transition to turbulence, slowing the rate of production of turbulence, delaying flow separation, or otherwise controlling small scale perturbations in the flow.

The present invention features a flow control system for controlling the flow of a fluid relative to and proximate a body. The flow control system comprises an elastomeric membrane having a top region for contacting the fluid and having a bottom region for covering at least a portion of the body. A set of membrane actuators is operatively coupled to the elastomeric membrane for causing displacement of the elastomeric membrane. A set of sensor elements is disposed proximate the top region of the elastomeric membrane for sensing flow conditions in the fluid. A feedback system is responsive to the sensor elements and coupled to the membrane actuators for controlling the displacement of the elastomeric membrane in response to sensed flow conditions.

According to the preferred embodiment of the flow control system, the membrane actuator causes displacement of the elastomeric membrane in a direction substantially tangential to the elastomeric membrane, such as extension and contraction of the elastomeric membrane. The elastomeric membrane preferably conforms to a shape of the body and in one example, is disposed around an underwater body, forming a hydrodynamic surface of the underwater body.

The preferred embodiment of the membrane actuator system includes a plurality of actuated elements coupled proximate the bottom region of the elastomeric membrane in a spaced relation, and an actuation mechanism system operatively coupled to each of the plurality of actuated elements, for independently moving the plurality of actuated elements. The movement of each actuated element causes displacement of a respective portion of the elastomeric membrane.

The plurality of actuated elements, in one embodiment, include a plurality of actuated spline elements extending from the bottom region of the elastomeric membrane in a substantially parallel spaced relation. These elements will be oriented substantially perpendicular to the local mean flow direction. The plurality of actuated spline elements are preferably movable in a direction substantially tangential to the elastomeric membrane, for causing the elastomeric membrane to be displaced in the direction substantially tangential to the flow direction. According to another embodiment, the actuated elements also include a plurality of actuated spline elements extending from the bottom region of the elastomeric membrane in a substantially parallel spaced relation, for providing bi-directional actuation. Actuation of the splines can be by any means known in the art, including solenoid, piezoelectric device or the like. Piezoelectric actuators can also be connected directly to the membrane without intermediate splines. The flow control system can also include a plurality of support elements disposed proximate the bottom region of the elastomeric membrane for supporting and maintaining a desired shape of the elastomeric membrane.

Examples of the sensor elements include, but are not limited to: pressure sensors for sensing local fluid surface pressure proximate the top region of the elastomeric membrane; shear stress sensors for sensing the local surface shear stress proximate the top region of the elastomeric membrane; and hydroacoustic sensors for sensing hydroacoustic conditions in the fluid. The sensors are preferably disposed on or embedded within the elastomeric membrane.

The preferred embodiment of the feedback device includes signal receivers coupled to the sensors for receiving input signals from the sensors indicating the flow conditions sensed in the fluid. One or more signal processors are coupled to each signal receiver for processing the signals and determining a desired displacement of the elastomeric membrane in response to the sensed flow conditions. A signal transmitter is coupled to each signal processor and membrane actuator for transmitting control signals to the membrane actuator and causing the membrane actuator to provide the desired displacement of the elastomeric membrane in response to the sensed flow conditions. The system of signal receivers, processors and transmitters is preferably configured as a neural network.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
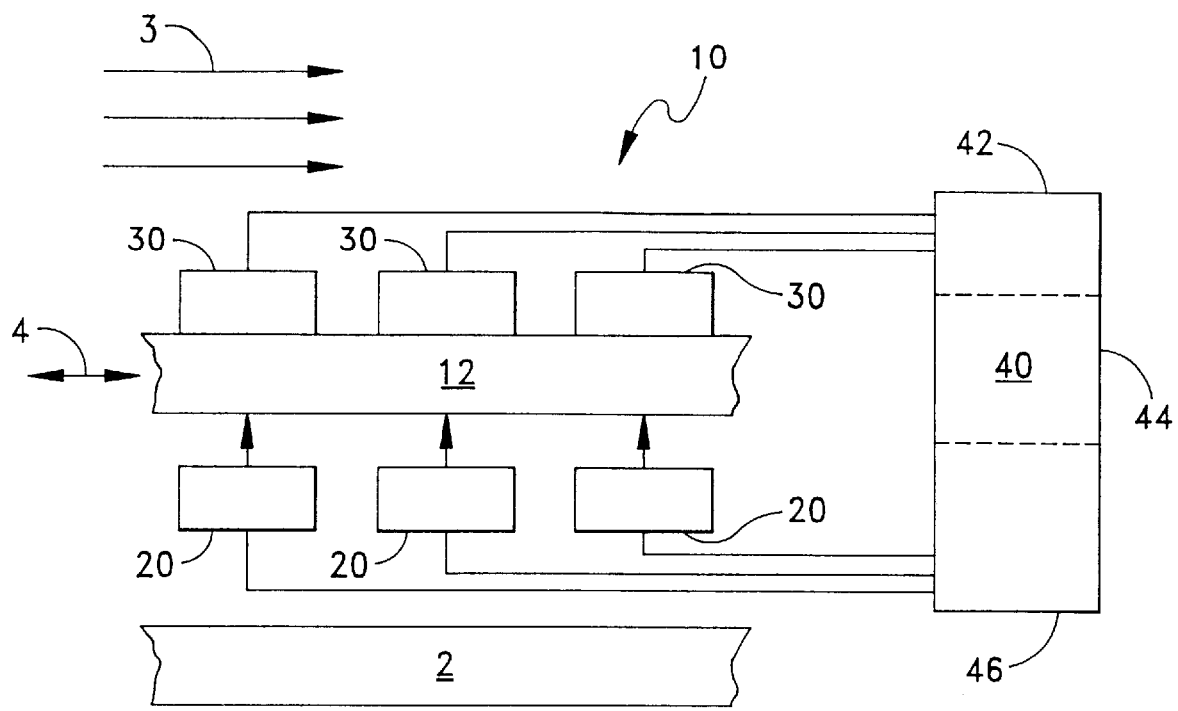
FIG. 1 is a functional block diagram of the flow control system according to the present invention.

The flow control system 10, FIG. 1, according to the present invention, is used to monitor and control the flow of a fluid around a body or object 2, such as an underwater vehicle or vessel. The flow control system 10 is used to create disturbances in the boundary layer flow 3 around the object 2, thereby reducing drag, radiated noise, and other undesirable effects caused by turbulent fluid flow around an object.

The flow control system 10 includes an actuated membrane 12 that extends around and is disposed proximate the object 2 about which the fluid flows. The actuated membrane 12 is preferably made of a sheet of elastomeric material such as rubber that conforms to the shape of the body 2 and is easily deformed or displaced, as will be described in greater detail below. The actuated membrane 12 has a top region 14 (shown in FIG. 3) that is exposed to the fluid flow and a bottom region 16 (shown in FIG. 3) that is disposed proximate the body or object 2. The displacement of the fluid flow 3, preferably in a direction tangential to the actuated membrane 12 as indicated by arrow 4 (e.g., by extension or contraction), causes a disturbance in the boundary layer fluid flow 3 that reduces drag, radiated noise, and other undesirable effects.

The flow control system 10 further includes a system of membrane actuators 20, such as a system of actuated splines, coupled to the membrane 12 for actuating and causing displacement of at least a portion of the actuated membrane 12. A system of sensor elements 30 are disposed proximate the top region 14 of the actuated membrane 12 for sensing flow conditions in the fluid, such as fluid pressure or shear stress. The actuated membrane 12 can also include hydroacoustic sensors for sensing hydroacoustic conditions, such as structural excitation or radiated noise. Hydroacoustic sensors can be used to optimize actuation or displacement of the actuated membrane for effects other than the hydrodynamic effects. The present invention also contemplates other types of sensors or transducers used to measure environmental conditions.

A feedback device 40, such as a computer or neural network, is responsive to each sensor element 30 and is coupled to each actuator 20. The feedback device 40 causes the membrane actuator 20 to actuate and displace the membrane 12 in response to various flow conditions sensed by the sensor elements 30.

According to the preferred embodiment, the feedback device 40 includes a signal receiver 42 that receives input signals from the sensors 30 indicating the sensed flow conditions. The feedback device 40 also includes at least one processor 44 that processes the input signals and determines the desired displacement of the actuated membrane 12 according to the sensed flow conditions. The feedback device 40 also includes at least one signal transmitter 46 that transmits control signals to membrane actuators 20, thereby causing the membrane actuators 20 to move or displace the actuated membrane 12 in response to the sensed flow conditions.

Processor 44 of the feedback device 40 includes either logic circuitry or software to provide the necessary processing of the input signals received from the sensor element 30 and to generate the resulting output or control signals transmitted to the membrane actuator 20. In one example, the feedback device 40 uses neural network technology and fuzzy logic to process the input signals and determine the optimal modification of the flow. According to another example, the feedback device 40 can use a physics-based algorithm to improve the performance of the feedback device 40 in optimizing the flow for a desired disturbance or effect in the boundary layer flow 3.

The flow control system 10 according to the present invention can be used with any object or body 2 that is subject to fluid flow including, but not limited to, external fluid flow relative to fixed or moving bodies or internal flows through piping, ducting or similar flow containment systems. The flow of the fluid relative to the body can be caused by movement of either the fluid, the body, or both. The fluid also includes any type of fluid including, but not limited to, water and air.

One application for the flow control system 10 is on an underwater vehicle or vessel. In this exemplary embodiment, the actuated membrane 12 is disposed around an underwater vehicle or vessel to form a hydrodynamic surface at least partially surrounding the vehicle or vessel. The membrane 12 can be formed as one continuous panel or a number of panels. The actuated membrane 12 is deformed or displaced to alter and control the boundary layer fluid flow and to reduce hydrodynamic drag or hydroacoustic radiated noise, or any other undesirable effect within a boundary layer fluid flow around the vehicle or vessel.

Figure 2:
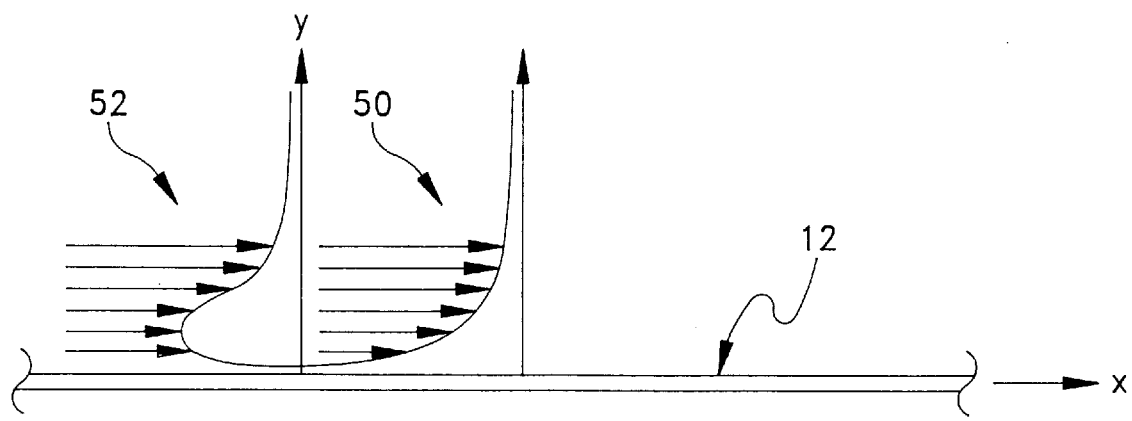
FIG. 2 is a schematic diagram of a nominal or undisturbed time-averaged boundary layer profile and an instantaneous disturbed boundary layer profile resulting from actuation of the actuated elastomeric membrane according to the present invention.

The displacement of the membrane 12, FIG. 2, superimposes a local and time varying surface sheer stress distribution on a nominal or undisturbed boundary layer 50. The surface sheer stress distribution propagates through the fluid particles in the boundary layer 50 by diffusion, thereby causing a modification of the turbulent boundary layer flow as indicated by a typical instantaneous boundary layer disturbance profile 52.

Proper phasing of the tangential actuation or displacement of the actuated membrane 12 will provide more favorable flow conditions. One effect is to delay transition to turbulence by sensing small fluctuations in the flow, such as those associated with Tolmien-Schlichting waves or turbulent spots in a transitioning flow, and by properly actuating the membrane to minimize propagation of the resulting instabilities or turbulence. In other words, the sensors 30 detect flow fluctuation and transmit this information to feedback device 40. The feedback device 40 provides a signal to actuators 20 which oscillate membrane 12 to reduce the instabilities. The actuator signal is optimized by use of a neural net or physics based model within feedback device 40.

Another effect is to reduce turbulence production in a boundary layer flow by modifying local flows across various regions of the actuated membrane 12 such as those associated with burst-sweep events in turbulent flows. For example, the membrane 12 could be actuated to accelerate the fluid locally in the region of an event to prevent local separation thereby preventing turbulence production.

Additional effects include delaying separation of the flow within laminar or turbulent boundary layers, or separation of the boundary layer from the surface, and reducing hydroacoustic excitation of hydromechanical structures as a result of turbulence. The present invention also contemplates other ways of controlling the fluid flow and other favorable effects from actuating the membrane 12 in various regions and thereby controlling small scale perturbations in the flow at those regions of the actuated membrane.

Since the optimal scale of motion of the membrane is likely to be small (for example, of sizes on the order of the energy-containing eddies in the unmodified turbulent flow), the sensor elements, actuators, signal receivers and signal transmitters can be constructed using microfabrication technologies such as those developed for manufacturing computer chips.

Figure 3:
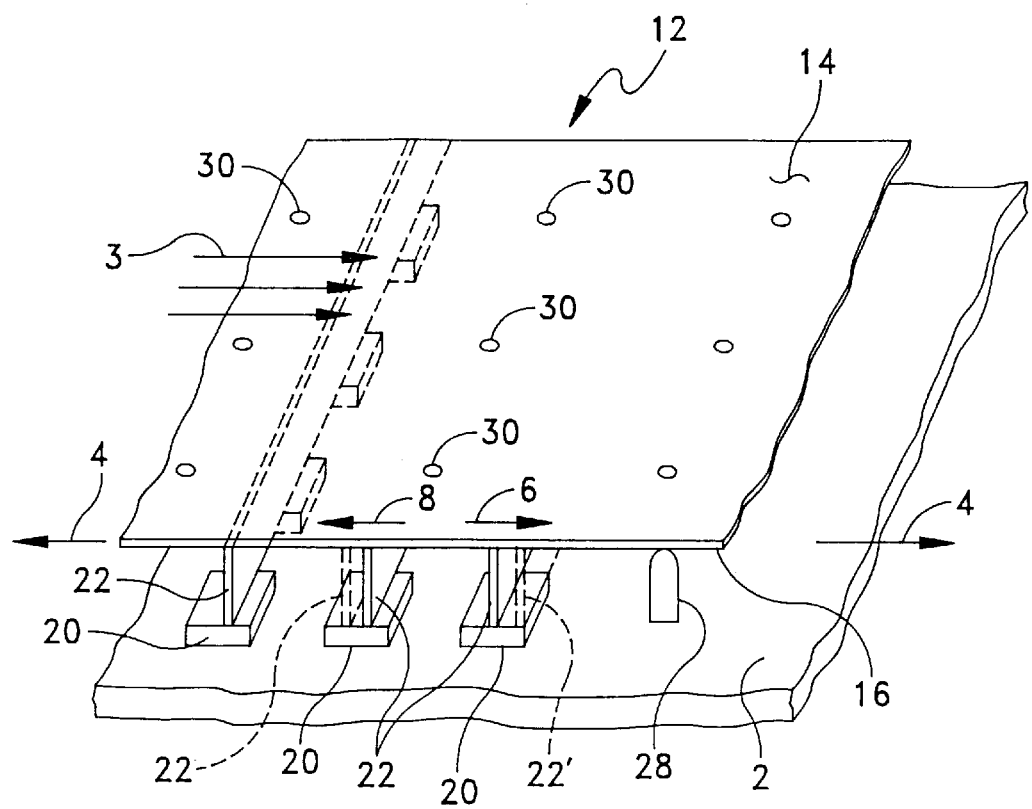
FIG. 3 is a perspective view of an actuated elastomeric membrane according to one embodiment of the present invention.

According to the preferred embodiment, FIG. 3 shows the physical portion of the invention which comprises a plurality of actuators 20 joined to membrane 12 by flexible spline elements 22. The flexible spline elements 22 are bonded to bottom region 16 of membrane 12 by any means known in the art such as by epoxy. As an alternative, spline elements 22 can be formed with the membrane 12 such as by molding and bonded to actuators 20. Spline elements 22 are elongated and extend into the plane of the FIG. and perpendicular to fluid flow 3. Actuators 20 are operatively coupled to spline elements 22 to displace them from a first position shown at 22 to a second position shown at 22' in a direction substantially tangential to the membrane 12 as indicated by arrows 4. Spline elements 22 are required to be flexible in order that a single element 22 can be connected to multiple actuators 20. By this arrangement, one end of an element 22 can be actuated in an extensional direction 6 while another end (not shown) is actuated in a compressional direction 8. Optional supports 28 can be joined between surface 2 and membrane 12 to support membrane 12 between elements 22. Sensors 30 are shown disposed on membrane 12. Both sensors 30 and actuators 20 are joined to feedback device 40 as shown in FIG. 1.

In operation, the sensors 30 provide indication to feedback device 40 that turbulence is incipient. Feedback device 40 then provides a signal to actuators 20 which causes displacement of the associated element 22 and the joined area of membrane 12. Optimally, feedback device 40 should take account of all sensor 30 signals when signaling actuators 20; however, the more proximate sensors 30 are given more affect than distant sensors 30 in formulating the actuator 20 displacement. This displacement will be either extensional, with the fluid flow, as shown at 6 or compressional, against the fluid flow, as shown at 8. Extensional displacement acts to counteract the formation of turbulence while compressional displacement is necessary to reset the actuator.

Figure 4:
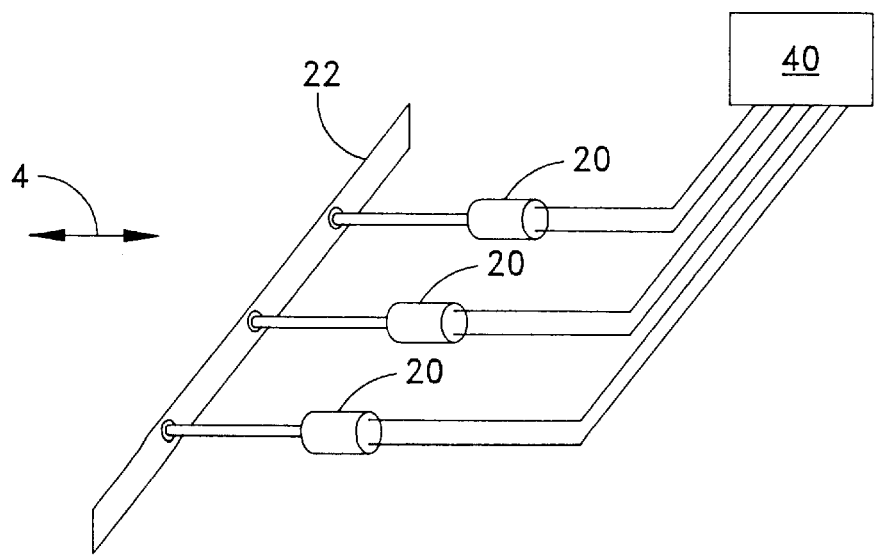
FIG. 4 is a schematic diagram of the flow control system with solenoid actuators, according to one embodiment of the present invention.
Figure 5:
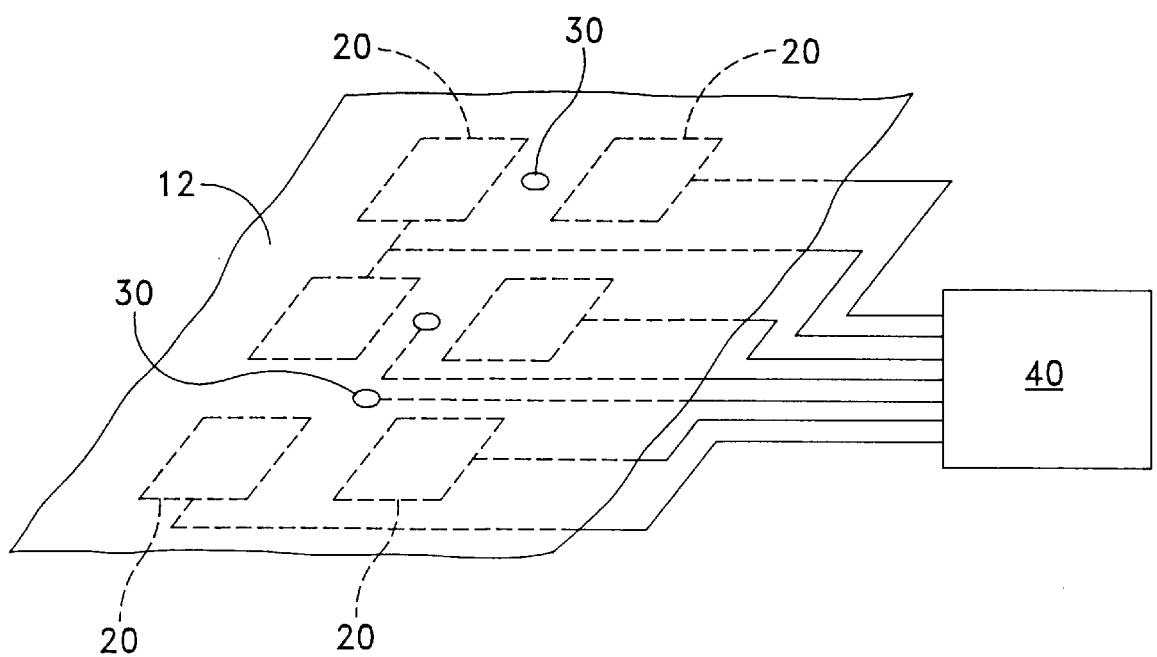
FIG. 5 is a schematic diagram of the flow control system with actuators joined directly to the membrane, according to another embodiment of the present invention.

In an additional embodiment shown in FIG. 4, solenoid actuators 20 are attached to the side of spline 22. The top of spline 22 is attached to membrane 12 (not shown). Actuators 20 are electrically connected to feedback device 40. In another embodiment shown in FIG. 5, piezoelectric or other actuators are joined directly to membrane 12. Sensors 30 are positioned on the surface of membrane 12. Both actuators 20 and sensors 30 are joined to feedback device 40. Upon receiving a signal from feedback device 40, actuator 20 would extend and cause extension of the joined membrane 12.

According to one embodiment, the actuated membrane 12 includes a sheet of elastomeric material such as rubber that extends around at least a portion of an object or body 2, such as an underwater vessel. The sheet of elastomeric material can conform to any shape of the object or body 2. One embodiment of the actuated elements 22 includes a plurality of spline elements made of a flexible material such as rubber or plastic and extending approximately ten sheet thicknesses from the bottom region 16 of the sheet of elastomeric material in a spaced relation of about one tenth of the unmodified boundary layer apart. Each spline element 22 extends along at least a portion of the sheet of elastomeric material so that movement of each spline element 22 causes an expansion or contraction in a respective portion of the sheet of elastomeric material.

By providing a displacement in a direction substantially tangential to the membrane 12, i.e., the sheet of elastomeric material, any displacement or motion normal to the sheet of elastomeric material can be minimized or eliminated, thereby reducing undesirable effects associated with disturbances to the local pressure field, for example, local adverse pressure gradients. Thus, tangential displacement of the membrane 12 imposes a time-dependent surface shear stress distribution on the fluid particles with minimal changes in the local surface pressure distribution. The effects of the surface shear stress distribution will be propagated to the fluid particles throughout the boundary layer by the natural effects of diffusion (See FIG. 2).

Accordingly, the flow control system of the present invention controls the boundary layer flow around an object in response to fluid conditions sensed around the object to reduce drag, radiated noise, and other undesirable conditions. The flow control system includes an actuated membrane that is displaced in a substantially tangential direction to cause a disturbance in the boundary layer flow and to thereby produce a desired effect in the boundary layer flow, such as a delayed transition to turbulence, a slowed rate of production of turbulence, a delayed flow separation, or other desired effects. The actuated membrane can produce different desired effects at different regions along the actuated membrane depending upon the sensed flow conditions at those regions.

In light of the above, it is therefore understood that within the scope of the appended claims, the invention may be practiced otherwise than as specifically described.

What is claimed is:

1. A flow control system, for controlling a boundary layer flow of a fluid against a body, said flow control system comprising:

an elastomeric membrane having a top region, for contacting said fluid, and having a bottom region, for covering at least a portion of a hydrodynamic surface of said body;

at least one membrane actuator operatively coupled to said bottom region of said at least one elastomeric membrane, for causing tangential displacement of said at least one elastomeric membrane;

at least one sensor element disposed proximate said top region of said at least one elastomeric membrane, for sensing at least one boundary layer flow condition in said fluid; and a sensor feedback device, responsive to said at least one sensor element and said at least one flow condition and operatively joined to said at least one membrane actuator, for transmitting a signal to said at least one membrane actuator to control tangential displacement of said at least one elastomeric membrane in response to said at least one boundary layer flow condition sensed in said fluid.

2. The flow control system of claim 1 wherein said at least one membrane actuator causes displacement of said elastomeric membrane in a direction substantially tangential to said top region of said elastomeric membrane.

3. The flow control system of claim 1 wherein said at least one membrane actuator causes expansion and contraction of at least a portion of said elastomeric membrane.

4. The flow control system of claim 1 wherein said elastomeric membrane conforms to an internal hydrodynamic surface of said body.

5. The flow control system of claim 1 wherein said elastomeric membrane is disposed around an underwater body, forming an external hydrodynamic surface of said underwater body.

6. The flow control system of claim 1 wherein said at least one membrane actuator includes:

a plurality of actuated elements coupled proximate said bottom region of said elastomeric membrane in a spaced relation; and an actuation mechanism operatively coupled to each of said plurality of actuated elements, for moving said plurality of actuated elements, wherein movement of at least one of said plurality of actuated elements causes displacement of a respective portion of said elastomeric membrane proximate said at least one of said plurality of actuated elements.

7. The flow control system of claim 6 wherein said plurality of actuated elements include a plurality of spline elements extending from said bottom region of said elastomeric membrane in a substantially parallel spaced relation.

8. The flow control system of claim 6 wherein said plurality of actuated elements are movable in a direction substantially tangential to said elastomeric membrane, for causing said respective portions of said elastomeric membrane to be displaced in said direction substantially tangential to said elastomeric membrane.

9. The flow control system of claim 6 further including a plurality of support elements disposed proximate said bottom region of said elastomeric membrane, for maintaining a desired shape of said elastomeric membrane.

10. The flow control system of claim 1 wherein said membrane actuator includes a piezoelectric actuation mechanism.

11. The flow control system of claim 1 wherein said at least one sensor element includes a pressure sensor, for sensing fluid pressure proximate said top region of said elastomeric membrane.

12. The flow control system of claim 1 wherein said at least one sensor element includes a shear stress sensor, for sensing a shear stress proximate said top region of said elastomeric membrane.

13. The flow control system of claim 1 wherein said at least one sensor includes a hydroacoustic sensor, for sensing hydroacoustic conditions at said top region of said elastomeric membrane.

14. The flow control system of claim 1 wherein said at least one sensor is embedded within said elastomeric membrane.

15. The flow control system of claim 1 wherein said feedback device includes:

a signal receiver, coupled to said at least one sensor, for receiving input signals from said at least one sensor indicating said at least one flow condition sensed in said fluid;

a signal processor, coupled to said signal receiver, for processing said signals and determining a displacement of said elastomeric membrane in response to said at least one flow condition; and a signal transmitter, coupled to said signal processor and said at least one membrane actuator, for transmitting control signals to said membrane actuator and causing said membrane actuator to provide said displacement of said elastomeric membrane in response to said at least one flow condition sensed in said fluid.

16. The flow control system of claim 15 wherein said signal processor includes a neural network.

17. An actuated elastomeric membrane, for providing boundary layer flow control to a fluid around a body, said actuated elastomeric membrane comprising:

a sheet of elastomeric material having a top region and a bottom region; and a plurality of actuated elements fixedly coupled to said bottom region of said sheet of elastomeric material, for tangentially displacing said sheet of elastomeric material by contracting and expanding separate regions of said elastomeric membrane.

18. The actuated elastomeric membrane of claim 17 wherein said plurality of actuated elements include a plurality of elongated spline elements extending from and spaced substantially parallel along said bottom region of said sheet of elastomeric material.

19. The actuated elastomeric membrane of claim 17 wherein said plurality of actuated elements are movable in a direction substantially tangential to said sheet of elastomeric material, for causing displacement of said sheet of elastomeric material in said direction substantially tangential to said sheet of elastomeric material.

20. The actuated elastomeric membrane of claim 17 further including at least one sensor element disposed proximate said top region of said sheet of elastomeric material, for sensing flow conditions in said fluid.

* * * * *